(12) United States Patent
McConnell

(10) Patent No.: US 7,892,505 B2
(45) Date of Patent: Feb. 22, 2011

(54) HYDROMETALLURGICAL PROCESS FOR THE TREATMENT OF METAL-BEARING SULFIDE MINERAL CONCENTRATES

(75) Inventor: Brian McConnell, Cochabamba (BO)

(73) Assignee: Royal Silver Company (Panama) S.A., Cochabamba (BO)

( * ) Notice: Subject to any disclaimer, the term of this patent is extended or adjusted under 35 U.S.C. 154(b) by 1084 days.

(21) Appl. No.: 11/261,315

(22) Filed: Oct. 29, 2005

(65) Prior Publication Data

US 2007/0098609 A1 May 3, 2007

(51) Int. Cl.
*C22B 11/00* (2006.01)
*C22B 15/00* (2006.01)

(52) U.S. Cl. .............................. 423/27; 423/28; 423/38; 423/39; 423/41; 423/43; 423/45; 423/46

(58) Field of Classification Search ................... 423/27, 423/28, 38, 39, 41, 43, 45, 46
See application file for complete search history.

(56) References Cited

U.S. PATENT DOCUMENTS

| | | | |
|---|---|---|---|
| 176,813 A | 5/1876 | Rogers | |
| 3,311,447 A * | 3/1967 | Stuart | 423/43 |
| 3,793,429 A | 2/1974 | Queneau et al. | |
| 3,856,913 A | 12/1974 | McElroy et al. | |
| 3,886,257 A * | 5/1975 | Snell | 423/27 |
| 3,949,051 A | 4/1976 | Pawlek | |
| 3,965,239 A | 6/1976 | Posel | |
| 3,974,253 A | 8/1976 | Snell | |
| 4,038,361 A | 7/1977 | Posel | |
| 4,071,422 A * | 1/1978 | Charlton et al. | 205/564 |
| 4,144,310 A | 3/1979 | Frankiewicz | |
| 4,218,242 A | 8/1980 | LeGrange | |
| 4,331,469 A | 5/1982 | Kunda | |
| 4,442,072 A * | 4/1984 | Baglin et al. | 423/22 |
| 4,647,307 A | 3/1987 | Raudsepp et al. | |
| 4,878,945 A | 11/1989 | Raudsepp et al. | |
| 5,096,486 A | 3/1992 | Anderson et al. | |
| 5,425,800 A * | 6/1995 | Buter et al. | 75/744 |
| 5,749,940 A | 5/1998 | Narita | |
| 6,666,903 B1 | 12/2003 | Green | |

* cited by examiner

*Primary Examiner*—Timothy C Vanoy
*Assistant Examiner*—James A Fiorito
(74) *Attorney, Agent, or Firm*—John C. Andrade

(57) ABSTRACT

A hydrometallurgical process for the treatment of complex silver-bearing sulfide ores and concentrates that recovers substantially all silver, lead, antimony, zinc, copper and sulfur, along with the chemical reagents utilized during the process. Finely ground ores and concentrates are leached under heat and pressure with water, sulfuric acid, nitric acid, oxygen, and a catalyst, and are further treated to recover silver in the form of silver chloride; iron in the form of iron hydroxide; copper and all traces of soluble toxic metals as sulfides; zinc as zinc ammonium sulfate and specifically nitric acid, sulfuric acid, oxygen, ammonia, and ammonium compounds as valuable fertilizer products.

15 Claims, 2 Drawing Sheets

HYDROMETALLURGICAL PROCESS FOR THE TREATMENT OF METAL-BEARING SULFIDE MINERAL CONCENTRATES

BACKGROUND OF THE INVENTION

1. Field of the Invention

The present invention relates to a hydrometallurgical process for the extraction and recovery of silver, copper, zinc, lead, antimony, iron, and sulfur from complex high-grade silver-bearing sulfide ores and flotation concentrates, plus the recovery of the chemical reagents used in the process and the production of zinc ammonium sulfate (ZAS). More specifically, the invention involves an acidic oxidation pressure leach of finely ground silver-bearing sulfide ores and concentrates, recovery of silver, iron, copper, zinc, and sulfur from the pregnant leach solution, and the recovery of lead, sulfur, antimony, and any residual silver from the tails. Chemical reagent inputs are recovered as fertilizer products. The instant invention is non-polluting, with minimal solid waste and no liquid waste requiring disposal, and offers high recovery of silver and other metallic values.

2. Description of Prior Art

Silver-bearing ores and concentrates from many mining districts around the world often contain toxic metals such as arsenic, antimony, and bismuth in addition to valuable lead, zinc, and copper. The silver contained in these concentrates is often in the form of sulfosalt minerals of arsenic and antimony, such as tetrahedrite, tennanite, stephanite, pyrargerite, and other complex minerals normally considered refractory to traditional hydrometallurgical processes, such as lixiviation with cyanide.

The few lead smelters in the world that currently purchase and process ores containing the above-mentioned toxic metals penalize such ores and concentrates to the financial detriment of the producer. The pyrometallurgical methods employed in a present-day lead smelter are little changed from a century ago. In a lead smelter, silver-bearing ores and concentrates are mixed with galena concentrates and oxidized by roasting or sintering in order to drive off the sulfur and volatile metals. The resulting sulfur dioxide gas and oxides of arsenic and antimony are pollutants that must be removed from the gas stream, often at significant cost. The calcine or sinter is then smelted in a blast furnace along with carbonaceous material to reduce the metal oxides to a metallic alloy. The gas stream from the blast furnace must be further treated to remove air-borne pollutants. The metallic alloy obtained from the blast furnace must then undergo additional pyrometallurgical treatment to separate silver from lead.

Research has been conducted during the last several decades to develop an oxidation pressure leach method to process complex silver-bearing sulfide ores and flotation concentrates, since such a method could be scaled to any size operation, the capital costs would be a fraction of the cost of a traditional pyrometallurgical smelter, and the plant could be situated near the mine or mill and operated by even a modest-sized company. Until the present invention, no proposed method has been able to process every type of complex silver ore, recovering all metallic values, using only small amounts of acid and other chemical reagent inputs, and without producing objectionable emissions, nor solid and liquid wastes needing disposal. A leach circuit employing a modification of U.S. Pat. No. 5,096,486 was installed in Idaho to process silver-bearing complex sulfide ores (previously processed with alkali to remove antimony) using a nitric acid/sulfuric acid/oxygen pressure leach process, but that circuit was discontinued because, among other reasons, operational costs exceeded the simple alternative of selling concentrates to a near-by smelter. At the present time, there are no plants employing nitric acid pressure leach methods to process silver-bearing complex sulfide ores.

Raudsepp, et al, (U.S. Pat. No. 4,647,307) teach a method to solubilize iron, arsenic, sulfur, and some silver from gold and silver-bearing pyrites and arsenopyrites using an oxidized nitrogen species such as nitric acid under conditions of heat and oxygen overpressure. Raudsepp, et al, proposed that any silver in solution be precipitated as silver thiocyanate and that the pregnant leach solution then be cooled to remove iron and arsenic, which had to be disposed of in some manner. It was assumed that gold and the remaining silver in the tails would be recovered by conventional cyanide lixiviation. Simple gold-bearing sulfide minerals such as pyrite and arsenopyrite rarely contain more than small amounts of gold and silver per ton of concentrate, thus the method proposed by Raudsepp, et al, not only was un-economic for use with such low-grade ores and concentrates, it did not address the metallurgical problems associated with extracting silver from high-grade, complex silver-bearing sulfide ores, such as the bulk of silver concentrates traded on the world market today.

Posel (U.S. Pat. No. 4,038,361) teaches a method to extract copper and silver from relatively simple sulfide ores, wherein large quantities of nitric acid (from 600 to 800 kgs of nitric acid per 1,000 kgs of concentrate) were used to oxidize the ore. The solids to liquids ratio was 1:10. Posel proposed that the NOx gases resulting from the reaction of nitric acid with ore be passed through an oxidizer and absorption column in order to regenerate nitric acid. Temperatures had to be carefully maintained so that sulfur would form beads during cooling, which beads could be separated from the leach slurry by screening. However, only the most simple sulfide ores respond to the Posel method with anything approaching the high silver recoveries described. In reality, silver contained in complex sulfide ores does not dissolve at the levels (99%+) reported by Posel even using high amounts of nitric acid, but rather dissolve at lower levels due to the formation of insoluble silver compounds. The beaded sulfur that Posel described entrains significant quantities of pregnant solution and will assay as much as 3% of the silver contained in the solution. This entrained silver is difficult to separate from the beaded sulfur. Moreover, any error in the cooling of the leach slurry, or a variation in the mineralogy of the ore, will result in the formation of "gummy" sulfur, which has a tendency to precipitate almost all of the silver from the pregnant solution due to an electrochemical exchange between elemental sulfur and unreacted pyrite in the slurry, causing the electro-deposition of silver on the surface of the elemental "gummy" sulfur. The silver contained in the "gummy" sulfur would require considerable additional processing in order to be separated. Furthermore, even were error completely overcome and the formation of "gummy" sulfur eliminated, not all the elemental sulfur will form beads of sufficiently large size to be collected by a screen; a significant portion of the elemental sulfur will report to the tails as finely divided sulfur, which would complicate the disposal of, or further processing of, the tails. No consideration is given in the Posel method for the elimination of arsenic from leach solutions—which arsenic would render the ammonium nitrate produced by this method unsuitable for sale. All the lead and antimony contained in the mineral concentrates would report to the tails as potentially toxic compounds, making untenable the statement by Posel that such tails could be sold to the road-building industry.

Kunda (U.S. Pat. No. 4,331,469) teaches a dual leach process, wherein complex silver ores would be treated at relatively low temperature and pressure with very high concentrations of nitric acid in an autoclave and then retreated with even higher levels of nitric acid to dissolve insoluble silver compounds. The solids to liquids ratio was about 1:7. Claims were made of 98% recoveries of silver. However, diligent investigation shows that Kunda's assertions of high silver recovery using the method described cannot be duplicated in silver-bearing concentrates where the preponderant mineral is any one of the sulfosalts containing antimony, which would include many of the complex silver ores produced around the world. Under the conditions described by Kunda a percentage of silver (25 percent or more) would be converted to insoluble compounds in the initial oxidation leach-which compounds are completely refractory to further acidic leaching. The method described by Kunda could only be used on a specific type of relatively non-complex silver concentrate and is not useful for the treatment of complex silver ores, especially those containing antimony. Kunda describes the precipitation of zinc sulfide from a pH neutral solution, however, it is well known to those with a passing knowledge of the art, that under such conditions, zinc sulfide is extremely slimy and requires extraordinary effort to filter. Another drawback to the method described by Kunda would be the presence of finely divided elemental sulfur in the oxidized tails of the leach reaction, plus insoluble oxide compounds of lead and antimony. This elemental sulfur would be difficult to remove and would hinder any attempt to further recover lead or antimony from such tails by either pyrometallurgical or hydrometallurgical methods. None of the oxidized metallic compounds contained in the tails could be released to the environment, but would require further treatment, which Kunda does not contemplate.

Anderson, et al, (U.S. Pat. No. 5,096,486.) teach a method wherein silver-bearing concentrates were treated under conditions of mild temperature and pressure, using oxygen, sulfuric acid, water, and sodium nitrite in an autoclave, thereby dissolving about 92% of the silver. The solids to liquids ratio was described as approximately 1:9. The pregnant leach liquor containing iron, arsenic, zinc, copper, etc., would be treated with solvents to extract a majority of the copper. The remaining dissolved metals, including iron, copper, zinc, and arsenic, and the high amounts of sulfate in the leach solution would be treated with lime and discharged to a tailings pond. The environmental stability of the solids produced by such lime treatment is the subject of debate. Because of the risk of arsenic and other toxic metals leaching from tailings ponds into the environment, and the undeniable fact that tailings ponds have been known to break with dramatically negative consequences for the environment, operations that require tailings ponds may be restricted in the future. Among the problems associated with the method proposed by Anderson, et al, are i) the very large quantity of sulfuric acid used in the pressure leach (1,931 kgs of sulfuric acid per 1,000 kgs of concentrate) that must be later neutralized at relatively high cost and disposed of into the environment; ii) the objectionable discharge of possibly unstable toxic compounds into the liquid phase of a tailings pond, from which they might leach into the environment; iii) the presence of elemental sulfur in the tails; and iv) the presence of lead sulfate and oxides of arsenic and antimony in the tails.

McElroy, et al, (U.S. Pat. No. 3,856,913) reveal a method for leaching simple copper-bearing sulfide concentrates in which silver salts are added to the slurry to improve the amount of copper dissolved in the leach medium. McElroy, et al, propose that between 0.2 kg and 1 kg of silver salt be added for every 1000 kgs of concentrate. The added silver would report to the tails as insoluble silver compounds and McElroy, et al, propose that the tails subsequently be leached with cyanide to recover silver. However, the use of silver salts in the manner proposed by McElroy, et al, is both uneconomical and impractical, given that the silver would report to the tails as insoluble compounds. The cost of leaching silver from the tails would offset any gains in the initial rate of copper dissolution. Given that, per weight basis, silver is a precious metal at least 100 times more costly than copper, to send such amounts of valuable silver into tailings would be commercially unthinkable. For these and other obvious reasons, no embodiment of the process proposed by McElroy has ever been put into operation.

SUMMARY OF THE INVENTION

It is a principal object of the present invention to provide a method to process complex silver-bearing sulfide ores and concentrates wherein silver and all other valuable elements contained in the ores and concentrates are recovered with high efficiency without producing liquid or solid waste.

It is another object of this invention to recover the chemical reagent inputs used in the processing of the metallic elements as commercially valuable products.

It is a further object of the present invention to decrease the amount of acid used to levels considerably lower than what has been described in previous inventions.

It is a further object of the present invention to employ a silver catalyst that substantially improves the oxidation leach reaction kinetics, thus increasing the initial rate of silver dissolution to the highest levels known to the art and completely oxidizing sulfur to sulfate.

It is a further object of the present invention that the silver catalyst be manufactured from silver chloride recovered from the pregnant leach solution and that the catalyst be recovered from each subsequent reaction for re-use ad-infinitum.

It is a further object of the present invention to employ low solids-to-liquids ratio in the initial reaction, and recycle all wash waters and leach liquors to subsequent reactions, thus eliminating the need to dispose of liquid waste. Another advantage to the employment of low solids-to-liquids ratio would be the size reduction of the commercial-scale processing equipment and the corresponding reduction of capital costs.

The present invention is a hydrometallurgical process for the treatment of complex silver-bearing sulfide mineral concentrates. The numerous steps in the process include grinding the concentrates, mixing the concentrates with water, acid and silver catalyst to form a slurry and heating the slurry to between 120° C. and 220° C. under pressure. The concentrates should be ground to a particle size preferably smaller than 100 microns. The silver catalyst is in the form of elemental silver powder. The slurry is preferably a high-density slurry having at least thirty percent (30%) solids and is preferably heated and mixed for one to four hours. When the acid is sulfuric and nitric acid, the sulfuric acid should be less than twenty-seven percent (27%) and the nitric acid less than twenty percent (20%) per weight of said concentrates. Preferably oxygen will be added during the heating and mixing stage to oxidize all elements to their highest valence state. The pressure inside the reaction vessel is preferably 100 psig to 250 psig. Upon discharge from the reaction vessel, the slurry is diluted with wash water from previous batches. The slurry is separated into a liquid phase and a solid phase by standard filtration methods. The solid phase, or tails, should be washed, and the wash solution should be used to dilute subsequent batches. The liquid phase, or pregnant solution, is treated to precipitate silver. The preferred precipitating agent to precipitate silver from the leach solution is a chloride compound that will form silver chloride. Other metals preferably are precipitated from the pregnant solution: iron would be precipitated out from the leach solution with a base of ammonia or ammonium hydroxide to form iron hydroxide; copper preferably would be precipitated out from the leach solution with a sulfide compound to form copper sulfide. The remaining metals, except for zinc, would be precipitated out under acidic conditions with a sulfide compound to form metallic sulfides. Trace iron is preferably removed by adding a base to increase the pH to seven (7). The tails are preferably reacted with ammonia carbonate.

The further preferred process is evaporating and cooling of the leach solution to crystallize and recover zinc ammonia sulfate (ZAS) and further precipitating out zinc from the leach solution with di-ammonium phosphate to form zinc mono-ammonium phosphate.

The present hydrometallurgical process can be used for the production of ZAS from zinc-bearing sulfide mineral concentrates and, similar to the above process, includes grinding the concentrates, mixing the concentrates with water, acid and silver catalyst to form a slurry and heating the slurry to between 120° C. and 220° C. under pressure, reacting the slurry with oxygen, diluting the slurry with wash water from previous reactions, filtering the slurry to form solid tails and a clear pregnant solution containing zinc and other metal ions. The solid tails would be washed. Silver, if present, would be precipitated from the leach solution with a chloride compound. Iron would be precipitated out from the leach solution with a base of ammonia or ammonium hydroxide. Other metals forming an insoluble metal sulfide under acidic conditions would be precipitated out of the leach solution with a sulfide compound to form metallic sulfides. At least 65%-80% of the liquids in the leach solution would be removed by evaporation, and the un-evaporated fraction of the leach solution would be cooled, thus crystallizing ZAS. A further preferred process would be the addition of a stoichiometric amount of di-ammonium phosphate and heating the solution, crystallizing out the remaining traces of zinc in the form of zinc mono-ammonium phosphate (ZAP). The remaining solution, after the removal of metals, would be valuable fertilizer. The use of a silver catalyst in the present process has a positive impact on the leach kinetics and offers advantages over previous processes. A further preferred process for the treatment of metal-bearing sulfide mineral concentrates includes a catalyzed pressure acid leach and grinding the concentrates and mixing the concentrates with water and acid to form a slurry. At that point silver catalyst preferably powdered elemental silver is added to the slurry and the slurry is heated under pressure and reacted with oxygen separating the slurry into solid tails and a leach solution. Valuable metals are then extracted from the leach solution as insoluble metallic compounds.

Other objects and advantages of the present invention will be apparent from the following detailed description.

DETAILED DESCRIPTION OF THE INVENTION

A complex silver-bearing sulfide ore might contain valuable amounts of silver, lead, zinc, antimony, and copper, along with iron, sulfur, arsenic, and bismuth. Such an ore would be refractory to traditional hydro-metallurgical methods such as lixiviation with cyanide and would be penalized by traditional smelters because of its content of toxic metals, principally antimony and arsenic. However, through use of the present invention, such an ore can be readily processed and all the valuable elements recovered as commercial products, along with the bulk of the chemical reagents used in the process.

Figure 1A:
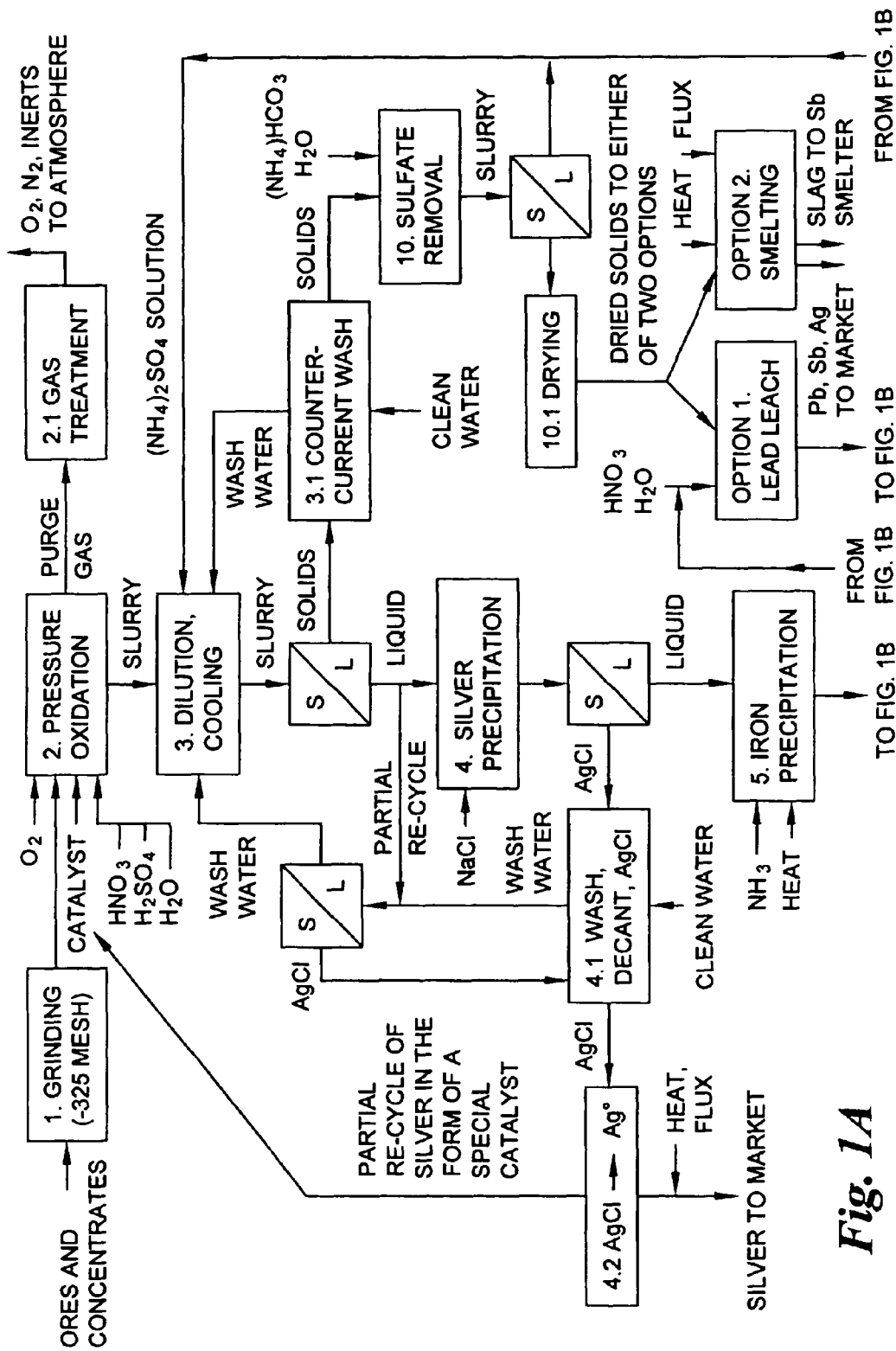
FIG. 1 is a flow diagram for the processing of a complex sulfide ore.
Figure 1B:
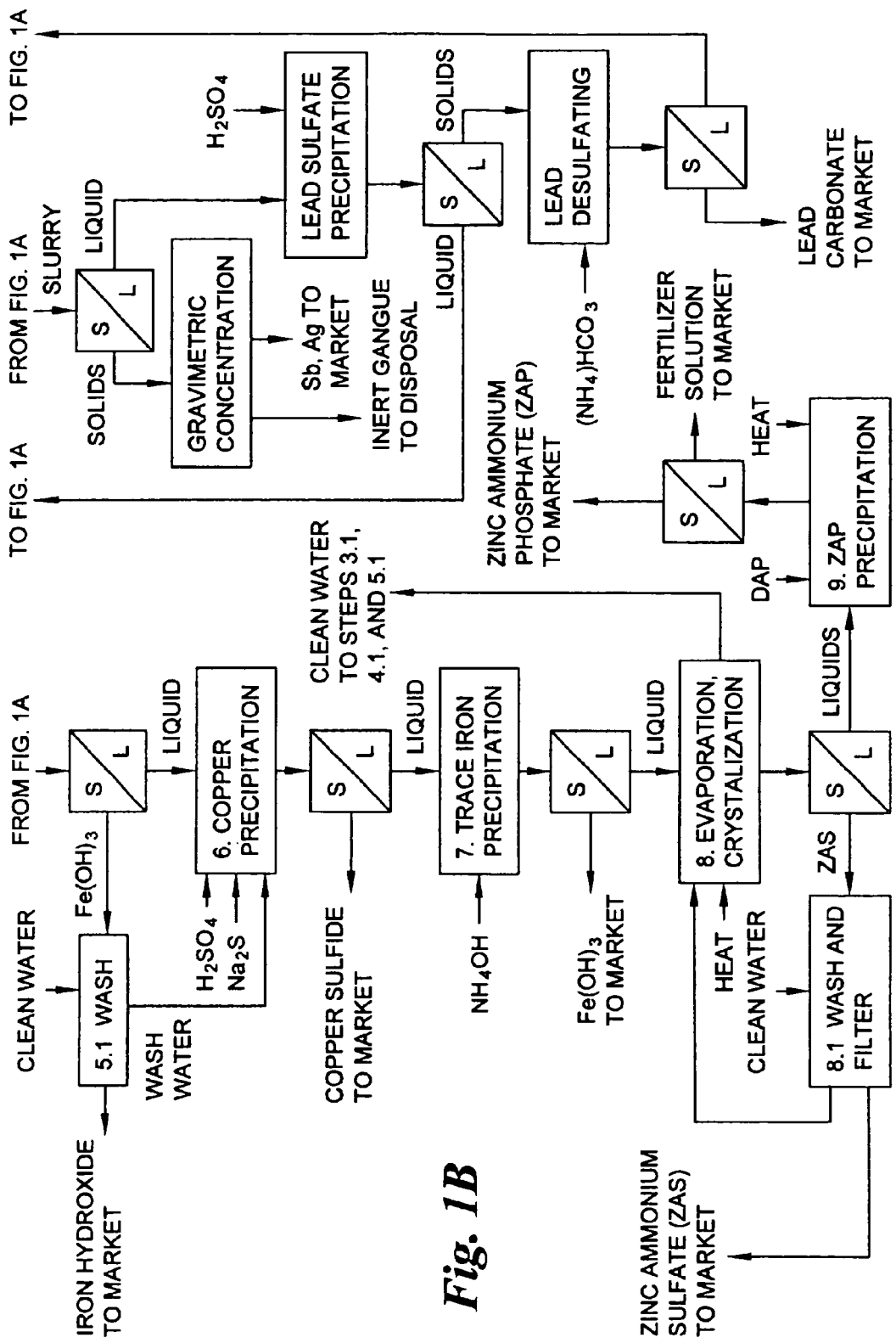

Referring to the drawing FIG. 1:

1. Ores and concentrates are ground to a fine powder using dry or wet grinding methods. The fineness of the grind should be less than 100 microns.

2. The ground ore is mixed with water and introduced into a reactor vessel, along with nitric acid (150 to 200 kgs—100% basis—per 1,000 kgs of concentrate), sulfuric acid (200 to 270 kgs—100% basis—per 1,000 kgs of concentrate), and a silver catalyst (4 kgs per 1,000 kgs of concentrate). This level of acid addition is much lower than the level of acid addition described in the cited previous inventions. The total ratio of solids-to-liquids should between 1:2 and 1:1.5. This ratio of solids-to-liquids is much lower than what has been described in prior art. The benefits obtained from using such a low solids-to-liquids ratio are improved reaction kinetics and a water balance that allows for the elimination of liquid waste streams by re-cycling wash waters and leach liquors to the dilution phase of subsequent reactions, as will be appreciated in the description that continues. Another important benefit obtained from the low solids-to-liquids ratio would be the size reduction of commercial-scale equipment and the lower capital costs associated with any commercial plant employing the present invention, compared to any other method described in any previous invention. Therefore, an important part of the present invention is the low solids-to-liquids ratio of 1:2 to 1:1.5, which ratio provides important benefits to the process reaction kinetics, the water balance, and commercial-scale capital costs. Continuing with the description, the reactor is then sealed and pressurized with 30 to 50 psig (pounds per square inch as measured by a gauge) oxygen overpressure. The contents of the reactor are stirred and heated to 80° C. Once the contents of the reactor reach 80° C., an exothermic reaction begins which increases heat and pressure. 30 to 50 psig oxygen overpressure should be maintained throughout the course of the reaction. To those with knowledge of the art, it will be apparent that the term oxygen overpressure refers to a partial pressure over and above the pressure generated by water vapor. Coolant, such as water or clear solution from previous batches, should be passed through the internal coil of the reactor vessel to control the formation of excess heat. The temperature and pressure may vary during the course of the reaction, but should not exceed 200° C. and 250 psig respectively—best results being obtained at 186° C. and 200 psig. The contents of the reactor vessel are stirred under the above-mentioned conditions for approximately 3 hours; although depending on the mineralogy of the ores and concentrates, the reaction can be complete in as little as 1 hour. Silver and other valuable metallic elements are dissolved, and all the lead, antimony, and gangue, plus a portion of the iron, and traces of silver report to the tails, according to the following chemical reactions:

$$3Ag_2S + 8HNO_3 = 6AgNO_3 + 2NO + 3S + 4H_2O$$

$$2AgNO_3 + H_2SO_4 = Ag_2SO_4 + 2HNO_3$$

$$3CuS + 8HNO_3 = 3Cu(NO_3)_2 + 2NO + 3S + 4H_2O$$

$$3ZnS + 8HNO_3 = 3Zn(NO_3)_2 + 2NO + 3S + 4H_2O$$

$$3FeS + 8HNO_3 = 3Fe(NO_3)_3 + 2NO + 3S + 4H_2O$$

$$3PbS + 8HNO_3 = 3Pb(NO_3)_2 + 2NO + 3S + 4H_2O$$

$$Bi_2S_3 + 8HNO_3 = 2Bi(NO_3)_3 + 2NO3S + 4H_2O$$

$$As_2S_3 + 8HNO_3 = 2H_3AsO_4 + NO + 7NO_2 + 3S + H_2O$$

$$S + 4HNO_3 = H_2SO_4 + 3NO_2 + NO + H_2O$$

$$Pb(NO_3)_2 + H_2SO_4 = PbSO_4(precip) + 2HNO_3$$

$$Ag_2SO_4 + PbSO_4 + Fe_2(SO_4)_3 + 6H_2O = Ag_2PbFe_2(SO_4)_2(OH)_6(precip) + 3H_2SO_4$$

$$3Ag_2SO_4 + 2H_3SbO_4 = 2Ag_3SbO_4(precip) + 3H_2SO_4$$

2.1 Although the chemistry of the reaction is such that NO gas generated by the action of nitric acid on the ores and concentrates upon contact with oxygen is converted to NO2 gas—which NO2, in turn, re-generates nitric acid upon contact with the liquid phase of the reactor contents—according to the reactions:

$$NO + \frac{1}{2}O_2 = NO_2$$

$$3NO_2 + H_2O = 2HNO_3 + NO;$$

nevertheless, there may be slight traces of NO and NO2 present in the gas stream upon depressurizing the reactor after completion of the leach reaction. Therefore, the gas stream exiting the reactor is treated to convert NO and NO2 to molecular nitrogen. The high-efficiency, low-cost conversion of a mixture of NO and NO2 (known as NOx) to molecular nitrogen (N2) is a known technology and has been the subject of various patents and does not warrant further elaboration here. Thus, it can be seen that the burden of airborne pollutants produced by the present invention is minimal and that the present invention allows for the complete elimination of said airborne pollutants at low operating and capital cost using inexpensive off-the-shelf equipment, in contrast to traditional smelting methods, wherein great quantities of airborne pollutants are produced with correspondingly high operating and capital costs for their abatement.

3. The content of the reactor vessel, in the form of a slurry, upon completion of the reaction, is cooled and diluted with wash water and leach liquors from prior batches in order to improve the filtration characteristics of the slurry. Without this dilution step, the slurry is too thick to be filtered by conventional means. With this dilution step, the separation of the slurry into a solid phase and a clear liquid phase can be readily accomplished with standard filtration equipment. Furthermore, by diluting the slurry to above the solubility product of zinc sulfate and zinc ammonium sulfate, zinc does not report to the tails, but remains in solution.

3.1 The diluted slurry is subjected to solids/liquids separation using standard commercial equipment, such as, but not limited to, a filter press. The solid tails are washed and the wash water is recycled to the dilution phase of a subsequent batch.

4. A stoichiometric amount of chloride compound, such as, but not limited to, sodium chloride or hydrochloric acid, is added to the clear pregnant solution, in order to quantitatively precipitate the dissolved silver as insoluble silver chloride. The silver chloride is separated from the solution by filtration. The precipitation of silver chloride from an acidic solution containing silver ions is common knowledge to those skilled in the art and does not require elaboration here.

4.1 The silver chloride precipitate is thoroughly washed with hot water, and this wash water is treated with a small amount of clear pregnant solution from step three in order to eliminate any excess chloride ions present in the wash water due to the inadvertent addition of more than a stoichiometric amount of chloride compound during step 4. The treated wash water is passed through a filter to collect any chloride precipitate that might form and is used to dilute further batches of reaction slurry, as described in step 3. The reason for the addition of pregnant solution to the wash water is to avoid any possibility for the formation of silver chloride in the dilution step, which silver chloride would report to the tails. The washed silver chloride is converted to metallic silver. The metallic silver is then melted in a crucible furnace with standard melting fluxes, such as, but not limited to, silica, borax, and soda ash. The melted silver can be poured into ingot molds and sold as is, due to its high purity. A certain amount of the silver chloride is then converted into a special silver catalyst, which has the property of improving the reaction kinetics and, therefore, the overall recovery of metallic values contained in the mineral ores and concentrates. The addition of this catalyst allows for the complete oxidation of complex mineral ores and concentrates. The use of this catalyst allows for the highest initial rates of dissolution of silver from complex sulfide ores known to the art. This catalyst can be completely recovered from each reaction batch without any loss and re-used ad infinitum. Although the exact mechanism is not well understood, experimentation has shown that under the exact same conditions, but without the addition of this special silver catalyst, the initial oxidation reaction is not complete, and a significantly deleterious amount of silver and sulfur contained in the original mineral ores and concentrates do not dissolve and instead reports to the tails, as is the case in all the methods described in previous inventions. With the addition of this special silver catalyst, the initial oxidation reaction is complete, in the sense that all elements in the initial ore or concentrate are oxidized to their highest valence state; for example: all sulfur contained in the initial ore or concentrate is converted to sulfate. The absence of elemental sulfur in the tails allows for the low-cost treatment of those tails to recover additional valuable metallic elements, such as lead and antimony.

The catalyst is produced in two steps by converting wet silver chloride to silver oxide through the addition of caustic soda in slight excess of stoichiometric and stirring the mixture until no white particles of silver chloride can be seen, and then reducing the silver oxide to metallic silver through the addition of common table sugar and stirring the mixture until no black particles of silver oxide can be seen. This two-step reaction should be carried out in a non-metallic vessel. The resulting finely divided elemental silver should be washed and added to subsequent reaction batches in the ratio of 4 kgs of catalyst per 1,000 kgs of concentrate. Since this catalyst is completely recovered and re-generated from each reaction, the cost of the catalyst per batch is nil.

Therefore, an important part of the present invention is the conversion of silver chloride to a silver catalyst for use in subsequent reactions and the complete recovery and re-generation of the catalyst for use in subsequent reaction batches without loss whatsoever and without increasing the overall cost of the process.

5. The clear solution from step 4 is heated to between 90° and 95° C. and anhydrous ammonia is added until the pH of the solution has been adjusted to pH 3.3. This pH adjustment causes the majority of the iron in the solution and most of the arsenic and bismuth to precipitate in the form of iron hydroxide, synthetic goetheite, iron arsenate, and oxybismuthnitrate, while at the same time maintaining a majority of the copper in solution for subsequent recovery, according to the reactions:

NH3+H2O=NH4OH

Fe2(SO4)3+6NH4OH=2Fe(OH)3(precip)+3(NH4)2SO4

Fe(NO3)3+3NH4OH=Fe(OH)3(precip)+3NH4NO3

Fe(OH)3(precip)+heat=FeO(OH)(goetheite)+H2O

2H3AsO4+Fe2(SO4)3=2FeAsO4(precip)+3H2SO4

Bi$^{+3}$+NO3$^-$+H2O=BiONO3(precip)+2H$^+$ 5.1 The iron-arsenic-bismuth hydroxide precipitate is separated from the process solution with standard filtration equipment, such as a filter press, and is washed to recover valuable entrained process solution. The wash water is sent to step 6 along with the process solution. This precipitate, depending on its arsenic content, can be sold for use in a number of industries, such as for the production of cement.

6. The combined process solution and wash water from step 5.1 is cooled to 50° C. Sulfuric acid is added to adjust pH to pH 1. Sodium sulfide in slight excess of stoichiometric is added to the solution. The solution is agitated. Copper will quantitatively precipitate in 15 minutes as insoluble copper sulfide, according to the reactions:

Na2S+H2SO4=Na2SO4+H2S

Cu$^{+2}$+H2S=CuS(precip)+2H$^+$

In addition, all remaining traces of soluble arsenic will be reduced from its penta-valent state to its tri-valent state and will also quantitatively precipitate in 15 minutes as insoluble sulfide compounds, according to the reactions:

H3AsO4+H2S=AsO3S$^{-3}$+3H$^+$+H2O

AsO3S$^{-3}$+6H$^+$=As$^{-3}$+S$^0$+3H2O

2As$^{-3}$+3H2S=As2S3(precip)+6H$^+$

Any bismuth present in the solution that was not hydrolyzed during the precipitation of iron hydroxide will also precipitate according to the reaction:

Bi2(SO4)3+3H2S=Bi2S3(precip)+3H2SO4.

These insoluble sulfide compounds are non-slimy and readily separated from the process solution by filtration or decantation. The copper sulfide precipitate can be sold to a copper smelter, or further treated to obtain metallic copper by commonly known methods obvious to those with an understanding of the art. The gas stream from the tank used to precipitate sulfides can be scrubbed with caustic soda to convert any traces of hydrogen sulfide gas into sodium sulfide, thus eliminating any possible airborne pollutants, according to the reaction:

H2S+2NaOH=Na2S+2H2O

It is common knowledge to those skilled in the art that sulfide precipitation will quantitatively reduce the levels of toxic metallic elements in acidic solutions to less than one part per million.

An important part of the present invention is the quantitative removal of copper and toxic metals from the process solution by sulfide precipitation, thereby insuring that the subsequent production of fertilizer solution will meet market standards.

7. The process solution from step 6 is subjected to pH adjustment with aqua ammonia to pH 7. This step will eliminate all remaining traces of soluble iron in the process solution by converting the iron to its hydroxide, according to the reaction:

Fe2(SO4)3+6NH4OH=2Fe(OH)3(precip)+3(NH4)2SO4

Fe(NO3)3+3NH4OH=Fe(OH)3(precip)+3NH4NO3

The insoluble iron hydroxide is separated from the process solution by filtration with standard equipment. The purpose of this step is to insure that subsequent zinc salts are of the highest quality.

8. The process solution is then partially evaporated to a point below the solubility product of zinc ammonium sulfate, or to approximately 25% to 50% of its original volume. Zinc ammonium sulfate will spontaneously crystallize from solution upon cooling, forming a double salt with six molecules of water, corresponding to the chemical formula:

Zn(NH4)2(SO4)2.6H2O.

8.1 The crystals of zinc ammonium sulfate can be separated from the process solution in a centrifuge or by any other common filtration method. The crystals should be washed to increase purity, and the wash water returned to the evaporation circuit. The zinc ammonium sulfate obtained by this method is of extremely high quality and can be sold as is to the fertilizer industry. The evaporate can be condensed and re-cycled as clean wash water and clean make-up water for subsequent reaction batches.

An important part of the present invention is the production of high-quality zinc ammonium sulfate by the partial evaporation of process solution, cooling, and crystallization; said zinc ammonium sulfate having a market value in excess of its zinc and ammonia content alone, and by sale of which part of the normally worthless sulfur contained in the original mineral ores and concentrates is recovered and given a market value, ammonia is recovered and given a market value, and a portion of the oxygen used in the reaction is recovered and given a market value.

Another important part of the present invention is the recycling of process solution via evaporation and the re-cycling of condensate as wash water and clean make-up water to subsequent reactions, thus eliminating any waste vapor that might contain traces of ammonia, nitrate, or sulfate compounds.

9. The remainder of the zinc is quantitatively precipitated from the process solution by the addition of di-ammonium phosphate to the clear solution from step 8.1., at the same time the process solution should be buffered with aqua ammonia to neutralize acid formation and generate additional valuable fertilizer compounds, all according to the reactions:

$$2ZnSO4+2(NH4)2HPO4+12H2O => 2ZnNH4PO4.6H2O+(NH4)2SO4+H2SO4$$

$$Zn(NO3)2+(NH4)2HPO4+6H2O => ZnNH4PO4.6H2O+NH4NO3+HNO3$$

$$HNO3+NH4OH => NH4NO3+H2O$$

$$H2SO4+2NH4OH => (NH4)2SO4+2H2O$$

To avoid the formation of an amorphous precipitate, the precipitation of zinc ammonium phosphate should be carried out at 90® to 95° C. in an agitated tank, under which conditions the precipitate will be hard, crystalline, and easily filtered, using standard filtration equipment. Zinc ammonium phosphate can be sold to the fertilizer industry as a soil conditioner.

An important part of the present invention is the quantitative recovery of the remaining traces of zinc from the processing of complex sulfide ores and concentrates in the form of a zinc ammonium phosphate precipitate, under conditions of heat and agitation to form a hard, crystalline precipitate—which precipitate can be readily filtered using common filtration equipment and has a market value in excess of its zinc content alone, thereby offsetting the cost of the di-ammonium phosphate used in its manufacture.

As can be appreciated from the above description, the process solution from step 9 is a valuable fertilizer product containing only ammonium sulfate and ammonium nitrate with slight traces of sodium sulfate and sodium nitrate. This fertilizer solution can be sold as is, or evaporated to any consistency, including solid. The levels of metallic elements contained in the fertilizer solution are well below acceptable thresholds. Should the fertilizer solution be further evaporated, the water vapor from the further evaporation process can be recovered by condensation and re-cycled as clean wash water and clean make-up water for subsequent reactions—in this manner there would be no air-borne waste vapor that might contain traces of ammonia, nitrate, or sulfate compounds.

A principal part of the present invention is the recovery of oxygen, nitric acid, sulfuric acid and ammonia as valuable fertilizer compounds. In addition, substantially all of the normally worthless sulfur contained in the ores and concentrates is converted to sulfate ion, which sulfate is further combined with ammonia to produce valuable fertilizer compounds.

10. The washed tails from the initial oxidation reaction are subjected to further processing to convert lead sulfate to lead carbonate, in order to recover the sulfate ion as a valuable fertilizer compound, and render the lead into a compound more readily smelted or recovered via hydrometallurgical methods. To this effect, the washed tails are mixed with a solution containing ammonium bicarbonate and agitated for 15 minutes. Lead sulfate will convert to lead carbonate and ammonium sulfate, according to the reaction:

$$PbSO4+2NH4HCO3=PbCO3+(NH4)2SO4+CO2+H2O$$

The large-scale conversion of lead sulfate to lead carbonate and the recovery of ammonium sulfate solution is a well-known technology used in the automobile battery recycling industry, thus needing little further elaboration here. The clear liquid phase, containing ammonium sulfate, but also traces of dissolved lead and possibly other metallic elements, is sent to step 3 (dilution) to dilute subsequent leach solutions.

As can be appreciated from the above description, a principal part of the present invention is the re-cycling of wash waters and leach liquors to the dilution step of subsequent reactions, such that all such liquids receive the full treatment to remove dissolved metallic elements, and are converted to high-quality fertilizer products. Therefore in any commercial embodiment of the present invention, there would be no liquid waste effluents needing disposal, which represents a significant improvement over prior art.

At this point, there are two options for the further processing of the tails:

Option 1. The lead can be quantitatively recovered from the tails by leaching the tails with nitric acid, thereby converting the insoluble lead carbonate to a soluble lead nitrate. The carbon dioxide emanating from this reaction would be recovered by washing with aqua ammonia to regenerate ammonium bi-carbonate for use in step 10. The soluble lead nitrate would be separated from the tails by filtration, and the lead would be removed from the solution by precipitation with sulfuric acid, thus regenerating nitric acid and forming lead sulfate. The lead sulfate precipitate could be further processed by filtration, washing, and treatment with ammonium bicarbonate to again form lead carbonate and ammonium sulfate. The result of this operation would be the complete recovery of lead from the initial mineral concentrates in the form of pure lead carbonate and the production of a valuable fertilizer by-product in the form of ammonium sulfate, according to the reactions:

$$PbCO3+2HNO3=Pb(NO3)2+CO2+H2O$$

$$CO2+NH4OH=NH4HCO3$$

$$Pb(NO3)2+H2SO4=PbSO4(precip.)+2HNO3$$

$$PbSO4+2NH4HCO3=PbCO3+(NH4)2SO4+CO2+H2O$$

The remaining tails, after removal of lead, could be subjected to a low-cost gravimetric separation of the gangue from the extremely fine precipitates of antimony, iron, and silver, using standard equipment, such as a series of gravimetric concentrating tables. The enriched antimony concentrate, containing compounds of iron and any remaining silver, could be dried and sold to an antimony smelter. The separated gangue would consist of quartz, aluminum oxides, and other compounds inert to the environment and could be sold as fill material or disposed of in a landfill.

Option 2. All of the lead and silver and most of the antimony could be recovered from the tails by subjecting the tails to a simple smelting process. The absence of sulfur in the tails substantially reduces the cost of treatment of furnace gases. The tails would be partially dried, mixed with a low-cost smelting flux (for example: trona, sand, limestone, natural borax, and vegetable carbon), and smelted in a reverberatory furnace. Lead would quantitatively collect any remaining silver during the reduction process, and both of these elements would report to the metallic bullion. Most of the antimony would be reduced and report to the metallic bullion, along with all of the lead and silver. The remainder of the antimony would remain oxidized and report to the slag. Iron and arsenic would be oxidized and would report to the slag. The slag could be ground and partially re-cycled until enriched with antimony and then sold to an antimony smelter. The metallic bullion containing lead, silver and antimony could be sold as is, or subjected to further hydrometallurgical processing with nitric acid and oxygen to recover each of the metallic elements. Such a hydrometallurgical process would be apparent to those knowledgeable in the art, and can be described as so: the metallic bullion would be granulated and leached with nitric acid and water under an oxygen overpressure. Silver and lead would form soluble nitrate compounds. Antimony would form insoluble antimony oxide. Nitric acid would be regenerated in the reactor due to the action of oxygen on its decomposition products. The liquid phase would be separated from the solid phase by filtration. The solid phase (antimony oxide) would be washed, and the wash water added to the pregnant leach solution. Silver would be precipitated from the pregnant leach solution with a chloride compound, such as hydrochloric acid, thereby forming silver chloride and regenerating nitric acid. Silver will form a chloride in preference to lead, thus the silver would be quantitatively removed from the solution as silver chloride, and only a small amount of lead would precipitate along with the silver; which lead can be separated from the silver chloride via washing with hot water, since lead chloride is soluble in hot water, whereas silver chloride is not. The remainder of the lead could be removed from the liquid phase by precipitation with sulfuric acid, thus forming lead sulfate and regenerating nitric acid. The lead sulfate would be treated as in option 1 to produce lead carbonate and ammonium sulfate for market. The resulting products from such a hydrometallurgical treatment of the metallic bullion would be lead carbonate, antimony oxide, silver chloride, and ammonium sulfate solution. The ammonium sulfate solution would be used to dilute subsequent leach reactions, as per step 3. The silver chloride would be further treated as per step 4 to produce pure metallic silver suitable for casting into ingots. Lead carbonate and antimony oxide are valuable compounds with a ready market.

The present invention is additionally illustrated in connection with the following non-limiting Example:

EXAMPLE

Step 1. GRINDING. A flotation concentrate from the Potosi mining district of Bolivia, consisting of several complex silver-bearing sulfosalt minerals, identified through x-ray diffraction as tetrahedrite [(AgCuFe)12Sb4S13], andorite [AgPbSb3S6], aramayoite [Ag(Sb,Bi)S2], matildite [AgBiS2], stephanite [Ag5SbS4], proustite [Ag3AsS3], and pyrargerite [Ag3SbS3] along with simple sulfide minerals, principally pyrite [FeS2], galena [PbS], and sphalerite [ZnS] is dry-ground in a porcelain jar mill for two hours using porcelain grinding media. A sample of the ground flotation concentrate is passed through a 325 mesh Tyler screen. The −325 mesh fraction of the mineral concentrate contains the following metallic values:

| | |
|---|---|
| Ag | 1.34% |
| Pb | 22.01% |
| Zn | 23.29% |
| Fe | 6.51% |
| Cu | 1.67% |
| Bi | 0.06% |
| As | 0.76% |
| Sb | 3.75% |
| S | 28.13% |

Step 2. OXIDATION. A 7 liter stainless steel pressure reactor is charged with 1200 grams of the −325 mesh mineral concentrate sample, 1600 ml. of water, 200 grams of nitric acid (100% basis), 320 grams of sulfuric acid (100% basis), and 4.8 grams of catalyst.

The reactor is sealed and the contents agitated via a magnetic stirrer. The pressure of the reactor is increased to 50 psig with oxygen. The temperature of the contents of the reactor is increased to 80° C. by passing hot water through an internal stainless steel coil. Upon reaching 80° C., an exothermic reaction begins, which increases temperature to 186° C. and vapor pressure to 150 psi. A 30 to 50 psig (pounds per square inch gauge) oxygen overpressure is maintained, such that the total pressure in the reactor is 180 to 200 psig. Upon reaching 186° C., cooling water is introduced into the internal coil as needed so as to maintain temperature and pressure within the range of 180-200° C. and 180-220 psig during the course of 3 hours. The total amount of oxygen consumed during pressurizing of the reactor and during the course of the oxidation reaction is 840 grams of O2.

Step 3. DILUTION, SOLIDS/LIQUIDS SEPARATION, and WASHING. After 3 hours, the contents of the reactor are cooled to 90° C., and the reactor is depressurized by releasing the gas phase to a washing column. 7,600 ml of clean water is used to dilute the contents of the reactor. The reactor is completely emptied and its contents are poured into a stainless steel pressure filter, and the solid phase is separated from the liquid phase. The liquid phase consists of 9,200 ml. of pregnant solution. The solid phase is washed with 1,250 ml of clean water, which wash water is set aside. (In actual plant practice the wash water would be used to dilute subsequent oxidation reactions.) The dried solid phase, or tails, weighs 663.3 grams.

Table 1. shows a summary of the conditions and the assay results of the various products: head ore, pregnant solution, wash water, and tails.

TABLE 1

OXIDATION REACTION

CONDITIONS

| Concentrate (g) | HNO3 (g) | H2SO4 (g) | H2O (l) | Catyst. (g) | Temp (° C.) | psig | Time (hr) | Solution (l) | Wash (l) | Tails (g) |
|---|---|---|---|---|---|---|---|---|---|---|
| 1200 | 200 | 320 | 1.6 | 4.80 | 170-200 | 200 | 3 | 9.2 | 1.25 | 663.3 |

| | Ag | Pb | Zn | Fe | Cu | Bi | As | Sb | S (total) | SO4 | S° |
|---|---|---|---|---|---|---|---|---|---|---|---|
| ASSAY RESULTS BY ELEMENT | | | | | | | | | | | |
| Head ore (%) | 1.34% | 22.01% | 23.29% | 6.51% | 1.67% | 0.06% | 0.76% | 3.75% | 28.13% | 0.00% | 0.00% |
| Catalyst | 99.40% | | | | | | | | | | |
| Pregnant sol. (g/l) | 2.081 | 0 | 29.41 | 5.6800 | 2.07 | 0.0035 | 0.035 | 0.0140 | 41.56 | 124.67 | 0.00 |
| Wash Water (g/l) | 0.782 | 0 | 8.72 | 1.3700 | 0.77 | 0.0011 | 0.0105 | 0.0009 | 11.81 | 35.43 | 0.00 |
| Tails (%) | 0.11% | 39.64% | 0.37% | 0.0351 | 0.14% | 0.08% | 0.07% | 6.52% | 7.53% | 18.69% | 1.30% |
| DISTRIBUTION OF ELEMENTS (in grams) | | | | | | | | | | | |
| Head Ore (g) | 16.08 | 264.12 | 279.48 | 78.1200 | 20.04 | 0.72 | 9.12 | 45.00 | 337.56 | 0.00 | 0.00 |
| Pregnant sol. (g) | 19.15 | 0.00 | 270.57 | 52.2560 | 19.04 | 0.03 | 0.32 | 0.13 | 382.32 | 1146.96 | 0.00 |
| Wash Water (g) | 0.98 | 0.00 | 10.90 | 1.7125 | 0.96 | 0.00 | 0.01 | 0.00 | 14.76 | 44.29 | 0.00 |
| Tails (g) | 0.73 | 262.93 | 2.45 | 23.2818 | 0.93 | 0.53 | 0.46 | 43.25 | 49.95 | 123.97 | 8.62 |

As shown in Table 2., the level of dissolution of the silver is 97%.

TABLE 2

LEVEL OF SILVER DISSOLUTION

| Silver in head ore | (grams) | 16.08 | |
| --- | --- | --- | --- |
| Silver in catalyst | (grams) | 4.77 | |
| Total | (grams) | 20.85 | |
| | | | % recov. |
| Silver in solutions | (grams) | 20.12 | 97% |
| Silver in tails | (grams) | 0.73 | 3% |
| Total | (grams) | 20.85 | 100% |

Step 4. SILVER PRECIPITATION. A 2,000 ml sample of the pregnant solution from step 3 is poured into a glass beaker. Sodium chloride solution is added to the 2,000 ml sample until no additional milky precipitate is observed. 2.4 grams of sodium chloride (100% basis) are used to effect the precipitation. The precipitate is filtered and the clear solution is assayed for silver. Assay shows that 99.99% of the soluble silver is recovered from the solution. The silver chloride precipitate is washed with clear water, until the wash water does not show any trace of dissolved copper, according to standard visible spectrophotometric methods, at which point the silver chloride precipitate is assumed to be free of any entrained pregnant solution. During the course of this washing, 600 ml. of wash water are produced and discarded. (In actual plant practice the wash water would be treated to remove residual chlorides and used to dilute subsequent oxidation reactions.) Table 3 shows the assays and efficiency of step 4.

TABLE 3

EFFICIENCY OF SILVER RECOVERY

| Silver in pregnant solution | 2.0810 | g/l Ag- |
|---|---|---|
| Silver in sterile solution | 0.0003 | g/l Ag- |
| EFFICIENCY | 99.99% | |

Step 5. IRON PRECIPITATION. A 1,000-ml sample of silver-free solution from step 4 is poured into a beaker, heated to 95° C., and stirred. Aqua ammonia is added until pH reaches 3.3. Iron ions precipitate as iron hydroxide. The solution is stirred and heated for one hour to insure complete precipitation of iron. The precipitate is separated from the solution by filtration. The solution, after filtration and assaying, is 870 ml. The precipitate is washed with 600 ml of clean water. The dried precipitate weighs 14.8 grams.

The efficiency of the precipitation of iron is 100%. Table 4 contains a summary of the conditions and assays for step 5.

TABLE 4

IRON PRECIPITATION

CONDITIONS

| Sample (l) | NH4OH (l) | NH3 (g/l) | NH3 (g) | Temp (° C.) | pH | Fe precip. | Ster.sol (l) | Wash sol. (l) |
|---|---|---|---|---|---|---|---|---|
| 1.00 | 0.225 | 135.50 | 30.49 | 100 | 2.3 | 14.80 | 0.87 | 0.60 |

| | Zn | Fe | Cu | SO4 | NH3 |
|---|---|---|---|---|---|
| ASSAY RESULTS BY ELEMENT | | | | | |
| Pregnant sol. (g/l) | 29.41 | 5.6800 | 2.07 | 124.67 | 0.00 |
| Sterile sol. (g/l) | 28.87 | 0.0001 | 1.85 | 141.97 | 31.15 |

TABLE 4-continued

IRON PRECIPITATION

| Wash sol. (g/l) | 6.41 | 0.0000 | 0.61 | 5.85 | 3.17 |
| Precipitate (%) | 4.93% | 38.52% | 0.35% | 5.28% | 0.07% |
| % Precipitation of Element | 2.5% | 100% | 2.5% | 0.6% | 0.0% |

DISTRIBUTION OF ELEMENTS (in grams)

| Pregnant sol. (g) | 29.41 | 5.68 | 2.07 | 124.67 | 0.00 |
| Sterile sol. (g) | 25.12 | 0.00 | 1.61 | 123.51 | 27.10 |
| Wash sol. (g) | 3.85 | 0.00 | 0.37 | 3.51 | 1.90 |
| Precipitate (g) | 0.73 | 5.70 | 0.05 | 0.78 | 0.01 |

Step 6. COPPER PRECIPITATION. The iron-free solution (870 ml.) and the wash water (600-ml) from step 5 are combined, as would be the case in actual plant practice. The combined solution (1,470 ml) is acidified to pH 0.8 by adding 7.35 grams of sulfuric acid (100% basis). To this acidified solution, a sodium sulfide solution is added. 3.5 grams of sodium sulfide (100% basis) are used to effect complete precipitation. The liquid is stirred in a glass beaker for 15 minutes. Copper sulfide precipitates from solution. The efficiency of the copper removal is 100%. Table 5 contains a summary of the conditions and assays for step 6.

TABLE 5

COPPER PRECIPITATION

CONDITIONS

| Sample (l) | Na2S (g) | H2SO4 (g) | Temp (° C.) | psig | pH | Cu precip. | Sterile sol. (l) |
|---|---|---|---|---|---|---|---|
| 1.47 | 3.50 | 7.35 | 20 | 0 | >1 | 3.20 | 1.49 |

| | Zn | Cu | SO4 | NH3 | NO3 |
|---|---|---|---|---|---|

ASSAY RESULTS BY ELEMENT

| Pregnant sol. (g/l) | 19.70 | 1.34 | 91.41 | 19.73 | 8.54 |
| Sterile sol. (g/l) | 19.45 | 0.0000 | 90.00 | 19.41 | 8.36 |
| Precipitate (%) | 3.70% | 61.56% | 4.21% | 0.00% | 0.00% |
| % Precipitation of Element | 0.4% | 100% | 0.1% | 0.0% | 0.0% |

DISTRIBUTION OF ELEMENTS (in grams)

| Pregnant sol. (g) | 28.96 | 1.98 | 134.37 | 29.00 | 12.55 |
| Sterile sol. (g) | 28.88 | 0.00 | 133.65 | 28.82 | 12.41 |
| Precipitate (g) | 0.12 | 1.97 | 0.13 | 0.00 | 0.00 |

Note:
the sterile solution and wash solution from the iron precipitation were combined to make the pregnant solution for this test.

Step 7. TRACE IRON PRECIPITATION. 19 ml of aqua ammonia solution containing 135.5 g/l NH3 is added to the copper-free solution (1,490-ml) from step 6 in order to adjust pH to pH6. No iron hydroxide precipitate forms, since the previous iron precipitation was 100% efficient. Because there is no precipitate, the solution is not filtered to remove hydroxide precipitate, as would be the case in actual plant practice.

Step 8. EVAPORATION and ZINC AMMONIUM SULFATE CRYSTALLIZATION. The solution from step 7 (1,509 ml) is boiled to 27% of its original volume (410 ml) and allowed to cool. Crystals of zinc ammonium sulfate form in the cooled solution. These crystals are washed and dried. 83% of the zinc in solution is recovered as zinc ammonium sulfate crystals. Table 6 contains a summary of the conditions and assays for step 8.

TABLE 6

ZINC-AMMONIUM-SULFATE (ZAS) CRYSTALIZATION

CONDITIONS

| Sample (l) | NH4OH (l) | NH3 (g/l) | NH3 (g) | Temp (° C.) | pH | ZAS (g) | Ster. sol. (l) |
|---|---|---|---|---|---|---|---|
| 1.49 | 0.019 | 135.50 | 2.57 | 100 | 6 | 146.50 | 0.41 |

| | Zn | SO4 | NH3 | NO3 |
|---|---|---|---|---|

ASSAY RESULTS BY ELEMENT

| Pregnant sol. (g/l) | 19.45 | 90.00 | 21.14 | 8.36 |
| Sterile sol. (g/l) | 12.20 | 148.91 | 46.83 | 29.44 |
| ZAS crystals (%) | 16.38% | 48.00% | 8.48% | 0.00% |
| % Precipitation of Element | 83% | 53% | 40% | 0% |

DISTRIBUTION OF ELEMENTS (in grams)

| Pregnant sol. (g) | 28.88 | 133.65 | 31.39 | 12.41 |
| Sterile sol. (g) | 5.00 | 61.05 | 19.20 | 12.07 |
| ZAS crystals (g) | 24.00 | 70.32 | 12.42 | 0.00 |

Step 9. ZINC AMMONIUM PHOSPHATE PRECIPITATION. The solution from step 8 is heated to 95° C. in a glass beaker and stirred. 11 grams of di-ammonium phosphate (83% DAP by weight) are added to the hot solution. Zinc ammonium phosphate (ZAP) forms a precipitate. 13 ml of aqua ammonia (assaying 135.5 g/L NH3) are added to maintain the pH at pH 7. Under these conditions, the precipitation of zinc is 99.9% efficient. The ZAP precipitate is separated from the solution and dried. The ZAP precipitate weighs 21.62 grams. The essentially metal-free solution contains 25% solids of fertilizer compounds. In plant practice, this solution could be further evaporated to increase solids to 50% and then sold as fertilizer solution, or evaporated to dryness, bagged, and sold. The solids in the fertilizer solution correspond to 84% ammonium sulfate and 16% ammonium nitrate. As can be appreciated from the assays, the total level of metal remaining in the fertilizer solution has been reduced to less than 1 ppm, except for zinc, which remains in solution at a level of 17.2 ppm. Soluble zinc in the fertilizer solution would be beneficial, since zinc is a micronutrient required by plants.

Table 7 contains a summary of the conditions and assays for step 9.

TABLE 7

ZINC-AMMONIUM-PHOSPHATE (ZAP) PRECIPITATION

CONDITIONS

| Sample (l) | NH4OH (l) | NH3 (g/l) | NH3 (g) | Temp (° C.) | pH | ZAP precip. | DAP (g) | DAP % | Ster. sol. (l) |
|---|---|---|---|---|---|---|---|---|---|
| 0.40 | 0.013 | 135.50 | 1.76 | 100 | 7 | 21.62 | 11 | 83% | 0.35 |

| | Ag | Pb | Zn | Fe | Cu | Bi | As | Sb | SO4 | NH3 | NO3 |
|---|---|---|---|---|---|---|---|---|---|---|---|
| ASSAY RESULTS BY ELEMENT | | | | | | | | | | | |
| Pregnant sol. (g/l) | | | 12.20 | | | | | | 148.91 | 51.23 | 29.44 |
| Sterile sol. (g/l) | 0.00023 | 0.0004 | 0.0172 | 0.00005 | 0.00016 | 0.00001 | 0.0001 | 0.0001 | 163.17 | 53.17 | 32.45 |
| ZAP precip. (%) | | | 22.66% | | | | | | 4.80% | 6.06% | 0.00% |
| DISTRIBUTION OF ELEMENTS (in grams) | | | | | | | | | | | |
| Pregnant sol. (g) | | | 4.88 | | | | | | 59.56 | 20.49 | 11.78 |
| Sterile sol. (g) | 0.00008 | 0.00014 | 0.00602 | 0.00002 | 0.00006 | 0.00000 | 0.00004 | 0.00004 | 57.11 | 18.61 | 11.36 |
| ZAP crystals (g) | | | 4.90 | | | | | | 1.04 | 1.31 | 0.00 |
| Efficiency | | | 100% | | | | | | | | |

Step 10. DESULFATING LEACH. A sample of the tails from step 3 weighing 588.60 grams is placed in a glass beaker. A solution containing water (3,200 ml) and ammonium carbonate/ammonium bi-carbonate (180 grams) is added to the beaker and the contents are stirred for 15 minutes under conditions of ambient heat and pressure. The lead sulfate in the tails is completely converted to lead carbonate. The contents of the beaker are filtered. The leach solution is set aside (in actual plant practice, this solution would used to dilute subsequent reactions.) The solids are washed with clean water (1,250 ml) and dried. The dry solids weigh 500.10 grams. Table 8 contains a summary of the conditions and assays for step 10.

slag phase is separated from the metallic phase with a tap of a hammer. Table 8 contains a summary of the assay and conditions of step 11. In actual plant practice, the recovery of antimony and lead through smelting in a proper furnace would yield superior results compared to the recoveries obtained in the laboratory muffle furnace, because volatile oxides of lead and antimony would be recovered from the plant furnace gases, and returned to the smelting circuit, something that cannot be accomplished in a laboratory muffle furnace. It must be emphasized that the high recovery of lead, antimony and silver through simple smelting is only possible

TABLE 8

DE-SULFATING LEACH

CONDITIONS

| Sample (g) | (NH4)2CO3 (g) | H2O (l) | Temp (° C.) | Pressure | Tails (g) | Wash sol. (l) | Tails | Preg. sol. (l) |
|---|---|---|---|---|---|---|---|---|
| 588.60 | 180.00 | 3 | 25 | 0 | 500.10 | 1.25 | 500.10 | 2.85 |

| | Ag | Pb | Zn | Fe | Cu | Sb | S (total) | SO4 | NH3 |
|---|---|---|---|---|---|---|---|---|---|
| ASSAY RESULTS BY ELEMENT | | | | | | | | | |
| Head Sample | 0.11% | 40.60% | 0.37% | 3.51% | 0.14% | 6.52% | 5.50% | | |
| Pregnant sol. (g/L) | 0.00 | 0.0227 | n/a | n/a | n/a | 10.92 | 10.63 | 31.89 | 10.92 |
| Wash sol. (g/L) | 0.00 | 0.0063 | n/a | n/a | n/a | 2.30 | 2.11 | 6.34 | 2.30 |
| Desulf. Tails | 0.13% | 44.97% | 0.42% | 3.93% | 0.17% | 6.84% | 3.43% | 0.00% | 0.00% |
| DISTRIBUTION OF ELEMENTS (in grams) | | | | | | | | | |
| Head Sample (g) | 0.65 | 238.97 | 2.18 | 20.66 | 0.82 | 38.38 | 32.40 | | |
| Pregnant sol. (g) | 0.00 | 0.06 | n/a | n/a | n/a | 31.12 | 30.30 | 90.89 | 31.12 |
| Wash sol. (g) | 0.00 | 0.01 | n/a | n/a | n/a | 2.88 | 2.64 | 7.93 | 2.88 |
| Desulf. Tails (g) | 0.64 | 224.89 | 2.10 | 19.65 | 0.85 | 34.21 | 17.15 | 0.00 | 0.00 |

Step 11. Further Recovery of Lead, Antimony, and Silver.
A sample of the dried tails from step 10 weighing 150 grams is mixed with a melting flux consisting of ulexite (75 grams), charcoal (20 grams), soda ash (30 grams), and silica (40 grams). The mixture is placed in a ceramic crucible and heated in a laboratory muffle furnace at 1200° C. for 3 hours. At the end of 3 hours, the contents of the crucible are poured into a mold. The contents of the mold are allowed to cool. The once the original mineral ores and concentrates have been processed as indicated in the steps described above. Any attempt to direct smelt the ores and concentrates, or any attempt to smelt tails that have not been subjected to a desulfating leach, or any attempt to smelt tails that contain elemental sulfur (such as the tails obtained through other processes described in prior art) will all fail. Table 9 contains a summary of the conditions and assays for step 10.

TABLE 9

SMELTING OF TAILS

CONDITIONS

| Sample (g) | Ulexite (g) | Char-coal (g) | Soda Ash (g) | Silica (g) | Bullion (g) | Slag (g) | Temp (° C.) | Time (hr) |
|---|---|---|---|---|---|---|---|---|
| 150 | 75 | 20 | 30 | 40 | 73 | 64 | 1200 | 3 |

|  | Ag | Pb | Sb |
|---|---|---|---|
| ASSAY RESULTS BY ELEMENT | | | |
| Tails | 0.215% | 45.23% | 6.70% |
| Bullion | 0.440% | 83.36% | 11.16% |
| Slag | 0.0065% | 0.43% | 0.93% |
| DISTRIBUTION OF ELEMENTS (in grams) | | | |
| Tails | 0.32 | 67.85 | 10.05 |
| Bullion | 0.32 | 61.19 | 8.19 |
| Slag | 0.00 | 0.28 | 0.60 |

SUMMARY OF RESULTS OF EXAMPLE

Table 10 contains a summary of the recoveries of valuable metallic elements and of the chemical inputs in the form of commercial products as a result of the processing of the sample mineral concentrate via the Example of the present invention.

commercial plant employing the present invention would not produce liquid waste needing disposal. Solid wastes would be minimal, easily stored on site, and depending on the local market for iron hydroxide might be completely eliminated as well; thus creating the possibility that any commercial embodiment of the present invention would be the world's first zero-emissions silver leach plant.

For these reasons, the present invention represents a significant improvement over the prior art.

I claim:

1. A hydrometallurgical process for the treatment of complex silver-bearing mineral concentrate comprising:
    a. grinding said concentrates;
    b. mixing said concentrates with water, acid, and silver catalyst in the form of elemental silver powder to form a slurry;
    c. heating said slurry to between 120° C. and 220° C. under pressure;
    d. filtering and washing said slurry to form solid tails and a clear pregnant solution containing silver ions;
    e. precipitating out silver from said solution.

2. Process of claim 1 wherein the grinding of said concentrates is to a particle size less than 100 microns.

3. Process of claim 1 wherein said slurry is a high density slurry having at least 30% solids.

4. Process of claim 1 wherein said acid is sulfuric acid and nitric acid and said sulfuric acid is less than 27% and said nitric acid is less than 20% per weight of said concentrates.

TABLE 10

OVERALL RECOVERY OF VALUABLE ELEMENTS AS COMMERICIAL PRODUCTS AS PER EXAMPLE

| | Element* | | | | | | | | | |
|---|---|---|---|---|---|---|---|---|---|---|
| | Ag | Pb** | Zn | Fe | Cu | Sb*** | S**** | NH3 | NO3 | O2 |
| % dissolved into liquid phase | 96.5% | 0.0% | 100.7% | 69.1% | 99.8% | 0.3% | 89.8% | 100.0% | 100.0% | 75.7% |
| % reporting to solid phase | 3.5% | 99.6% | 0.9% | 29.8% | 4.6% | 98.1% | 11.3% | 0.0% | 0.0% | 7.9% |
| Efficiency of recovery from liquid phase | 100.0% | 0.0% | 97.2% | 100.4% | 95.2% | 0.0% | 93.2% | 92.9% | 56.6% | 72.0% |
| Efficiency of recovery from solid phase | 100.1% | 90.2% | 0.0% | 0.0% | 0.0% | 81.5% | 89.8% | 0.0% | 0.0% | 100.0% |
| Total recovery as per raw data | 100% | 90% | 98% | 69% | 95% | 78% | 94% | 93% | 57% | 62% |
| Total recovery as per adjusted data | 99% | 99% | 98% | 69% | 93% | 93% | 94% | 93% | 57% | 62% |

Notes on adjusted data:
*For those elements whose raw data recovery was more than 100%, the data were adjusted to increase the head assay, thus decreasing the adjusted recovery.
**Pb recovery was calculated as (1 − (Pb content of Tails/Pb content of Slag)). This calculation assumes that 100% of Pb reports to the solid phase, and that the difference between the Pb content of the tails and the Pb content of the metallic bullion plus the Pb content of the slag represents Pb that was volatilized during the smelting process, and that this volatile Pb would be recovered by cooling and filtralion of the furnace off-gases, as is normal plant practice.
***Sb recovery was calculated as (99 − (Sb content of Tails/Sb content of Slag)). This calculation assumes that 99% of Sb reports to the solid phase, and that the difference between the Sb content of the tails and the Sb content of the metallic bullion plus the Sb content of the slag represents Sb that was volatilized during the smelting process, and that this volatile Sb would be recovered by cooling and filtration of the furnace off-gases, as is normal plant practice.
****S recovery was calculated by dividing the S contained in the various fertilizer products by the S contained in the mineral sample plus the S contained in the sulfuric acid added to the liquid phase.

As can be appreciated from the above detailed description and non-limiting example, a commercial-scale plant employing the present invention would be able to treat any complex silver-bearing sulfide mineral ore or concentrate, regardless of its content of normally refractory mineral compounds, such as sulfosalts of antimony and arsenic, with high recovery of silver, lead, zinc, sulfur and other valuable metals, using relatively low amounts of acid, and recovering the principal chemicals used in the processing, i.e., sulfuric acid, nitric acid, ammonia, ammonium compounds, and oxygen, as valuable fertilizer compounds. Thus any commercial embodiment of the present invention would find the cost of chemical inputs to be almost completely offset by the sale of products, resulting in low cost and high profits. Of equal importance as the efficient recovery of metallic values and chemical inputs, any 5. Process of claim 1 wherein said slurry is heated and mixed for 1-4 hours.

6. Process of claim 1 further comprising adding oxygen during the heating and mixing stage to oxidize all elements to their highest valence state.

7. Process of claim 1 wherein pressure inside the reaction vessel is 100-250 psig.

8. Process of claim 1 wherein silver is precipitated out of said leach solution with a chloride compound to form silver chloride.

9. Process of claim 1 further comprising precipitating out iron from said leach solution with a base selected from the group consisting of ammonia and ammonium hydroxide to form iron hydroxide.

10. Process of claim 1 further comprising precipitating out copper from said leach solution with a sulfide compound to form copper sulfide.

11. Process of claim 1 further comprising precipitating out all metals forming insoluble metal sulfides under acidic conditions with a sulfide compound to form metallic sulfides.

12. Process of claim 1 further comprising evaporation and cooling of said leach solution, precipitating out zinc ammonia sulfate (ZAS).

13. Process of claim 12 further comprising precipitating out zinc from said leach solution with di-ammonium phosphate to form zinc mono-ammonium phosphate.

14. Process of claim 1 further comprising removing trace iron by adding a base to increase the pH to 7.

15. Process of claim 1 further comprising reacting tails with ammonia carbonate.

* * * * *